United States Patent [19]

Oishi

[11] Patent Number: 5,161,024

[45] Date of Patent: Nov. 3, 1992

[54] PIXEL ARRAY SCANNING CIRCUITRY FOR A SOLID STATE IMAGING APPARATUS

[75] Inventor: Yasuhiro Oishi, Tatsunomachi, Japan

[73] Assignee: Olympus Optical Co., Ltd., Tokyo, Japan

[21] Appl. No.: 698,219

[22] Filed: May 10, 1991

[30] Foreign Application Priority Data

May 16, 1990 [JP] Japan .................. 2-124274

[51] Int. Cl.$^5$ .................. H04N 3/14; H04N 5/335
[52] U.S. Cl. .................. 358/213.24; 358/213.11; 358/213.26; 358/213.31
[58] Field of Search .................. 358/213.11, 213.24, 358/213.26, 213.23, 213.29, 213.27, 213.31, 213.15, 213.16, 212; 357/24 LR; 377/75, 76, 51, 58, 60-63, 54, 68; 307/480

[56] References Cited

U.S. PATENT DOCUMENTS

| | | | |
|---|---|---|---|
| 4,751,559 | 6/1988 | Sugawa et al. | 357/30 |
| 4,851,177 | 7/1989 | Ohzu | 358/213.22 |
| 4,875,091 | 10/1989 | Yamada et al. | 358/42 |
| 4,929,994 | 5/1990 | Matsumoto | 357/30 |

FOREIGN PATENT DOCUMENTS

2103049  2/1983  United Kingdom .............. 358/212

OTHER PUBLICATIONS

"MOS Area Sensor: Part II—Low-Noise MOS Area Sensor With Antiblooming Photodiodes", Shinya Ohba et al, IEEE Transactions on Electron Devices, vol. ED-27, No. 8, Aug. 1980, pp. 1682-1687.

"A New MOS Image Sensor Operating In A Non-Destructive Readout Mode", T. Nakamura et al, IEDM 1986, pp. 353-356.

Primary Examiner—James J. Groody
Assistant Examiner—Safet Metjahic
Attorney, Agent, or Firm—Armstrong & Kubovcik

[57] ABSTRACT

A solid state imaging apparatus includes a pixel array composed of CMD pixels, and vertical and horizontal scanning circuits for sequentially selecting pixels in the pixel array by an X-Y address method so as to read output signals. The horizontal scanning circuit is constructed so that, prior to a reading period, the horizontal scanning circuit connects bit lines to a reference line of a reference potential for the amount of time equal to a 1-bit period or a bit period less than the number of horizontal pixels. Such construction limits an electric current flowing to the reference line, thereby inhibiting an increase in the potential of the reference line. The generation of a lateral smear is thus inhibited.

8 Claims, 11 Drawing Sheets

FIG.4
PRIOR ART b: HIGH-LIGHT PORTION
a: LATERAL SMEAR

PIXEL ARRAY SCANNING CIRCUITRY FOR A SOLID STATE IMAGING APPARATUS

BACKGROUND OF THE INVENTION

The present invention relates to a solid state imaging apparatus which inhibits the generation of a lateral smear, and reduces the amount of electric current consumed. This solid state imaging apparatus uses a Charge Modulation Device (hereinafter abbreviated as a CMD) as a pixel.

Various solid state imaging apparatuses having been hitherto well known are are composed of imaging elements having MIS-type light receiving/accumulating portions. Among such solid state imaging apparatuses there are solid state imaging apparatuses which utilize imaging elements having MIS-type light receiving/accumulating portions as well as internal amplifying functions. A solid state imaging apparatus which utilizes the CMD imaging element proposed by the applicant of this invention is an example of such solid state imaging apparatuses. This solid state imaging apparatus is disclosed in Japanese Patent Laid-Open No. 61-84059 and in a thesis titled "A NEW MOS IMAGE SENSOR OPERATING IN A NON-DESTRUCTIVE READ-OUT MODE" on pages 353 to 356 of a collection of theses for the International Electron Device Meeting (IEDM) held in 1986.

Figure 1:
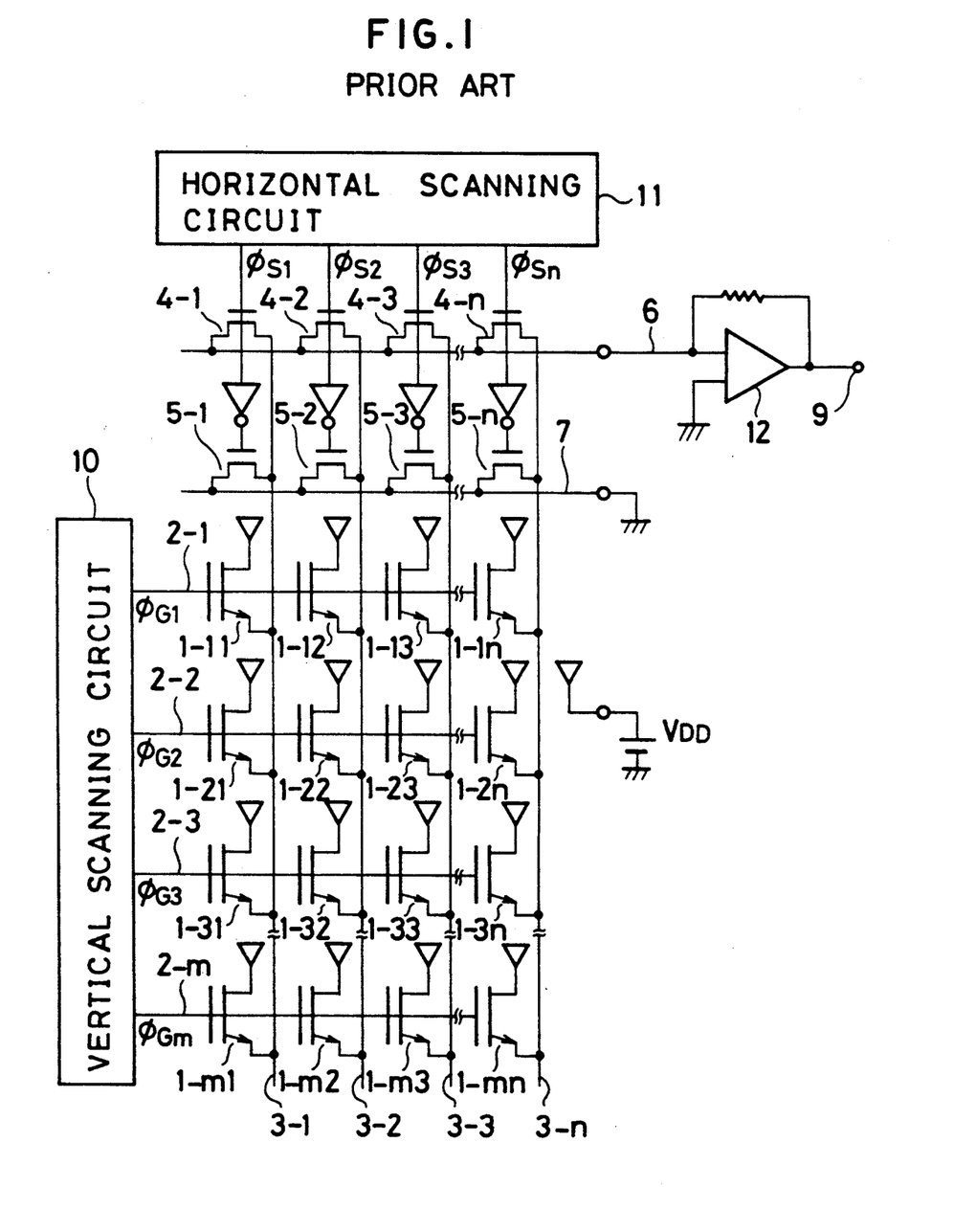
FIG. 1 is a diagram showing the structure of the circuitry in the conventional solid state imaging apparatus.

A conventional solid state imaging apparatus using such a CMD imaging element will now be described with reference to the circuit configuration of FIG. 1. CMDs 1-11, 1-12 ... 1-mn, each constituting a pixel, are first arranged in a matrix manner. A video bias $V_{DD}$ ($>0$) is applied to the drain of each CMD. The gate terminals of the CMDs arranged in an X direction are respectively connected to row lines 2-1, 2-2 ... 2-m. The source terminals of the CMDs arranged in a Y direction are respectively connected to bit lines 3-1, 3-2 ... 3-m. The bit lines 3-1, 3-2 .. 3-m are all connected to a signal line 6 through transistors for selecting a column ( column selecting transistors 4-1, 4-2 ... 4-n), respectively. Also, the bit lines 3-1, 3-2 ... 3-m are all connected to a grounded reference line 7 through non-selection transistors 5-1, 5-2 ... 5-n, respectively. The signal line 6 is connected to a current-voltage conversion type preamplifier 12 whose input is virtually grounded.

The output terminal 9 of the preamplifier 12 reads an image signal having a negative polarity in a time series manner. The row lines 2-1, 2-2 ... 2-m are connected to a vertical scanning circuit 10. Signals $\phi_{G1}, \phi_{G2} ... \phi_{Gm}$ are applied to the row lines 2-1, 2-2 .. 2-m. The gate terminals of the column selecting transistors 4-1, 4-2 .. . 4-n and the non-selection transistors 5-1, 5-2 ... 5-n are connected to a horizontal scanning circuit 11. Signals $\phi_{s1}, \phi_{s2} ... \phi_{Sn}$ and their inversion signals are applied to the column selecting transistors 4-1, 4-2 ... 4-n and the non-selection transistors 5-1, 5-2 ... 5-n. All the CMDs are formed on the same substrate to which a substrate voltage $V_{sub}$ is applied.

The reference line 7 is used for fixing the electric potentials of bit lines which are not selected at the same level as those when a reading operation is performed. It is provided with a function to eliminate the effect caused by the parasitic capacity of each bit line.

Figure 2:
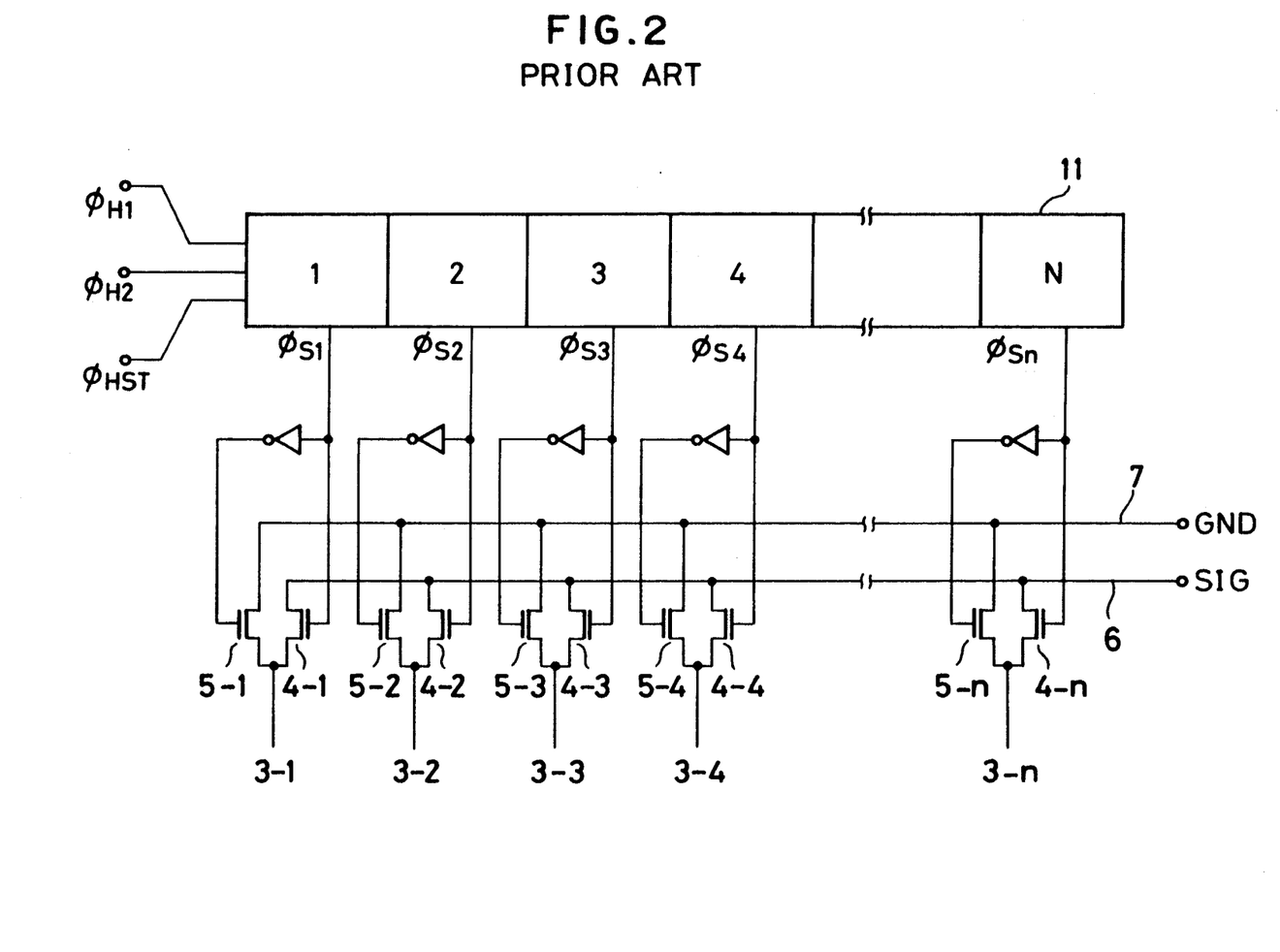
FIG. 2 is a diagram showing the structure of a section of the horizontal scanning circuit in the conventional solid state imaging apparatus.
Figure 3:
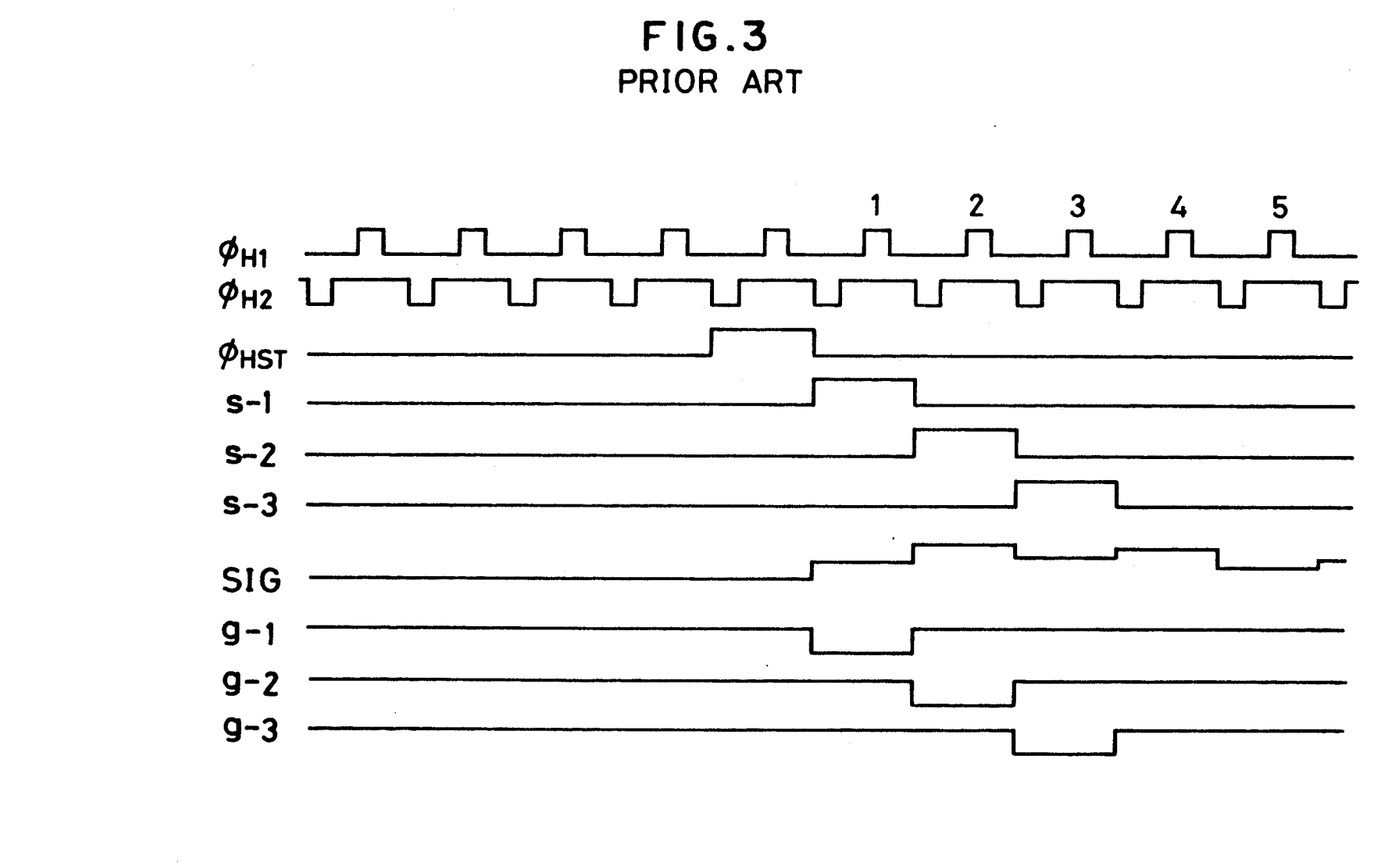
FIG. 3 is a timing chart illustrating the operation of the section of the horizontal scanning circuit.

FIG. 2 is a view in which the section of a horizontal scanning circuit is selected and shown in detail. FIG. 3 is a timing chart illustrating the operation of the horizontal scanning circuit section. In FIG. 3, reference characters $\phi_{H1}$ and $\phi_{H2}$ denote clock pulses applied to the horizontal scanning circuit 11, and reference Character $\phi_{HST}$ denotes a start pulse. Reference characters s-1, s-2 and s-3 denote horizontal selecting signals $\phi_{S1}, \phi_{S2}$ and $\phi_{S3}$ applied to the gates of the column selecting transistors 4-1, 4-2 and 4-3, respectively. Reference characters g-1, g-2 and g-3 denote inversion signals applied to the gates of the non-selection transistors 5-1, 5-2 and 5-3, respectively.

The operation of the vertical scanning circuit 10 selects pixels connected to the row lines on which vertical scanning signals have assumed a reading potential. When the horizontal selecting signals $\phi_{S1}, \phi_{S2} ... \phi_{Sn}$, which are output from the horizontal scanning circuit 11, sequentially turn ON the column selecting transistors 4-1, 4-2 ... 4-n, light accumulating signals of the selected pixels are sequentially output from the output terminal 9 through the signal line 6, as indicated by SIG of FIG. 3.

Figure 4:
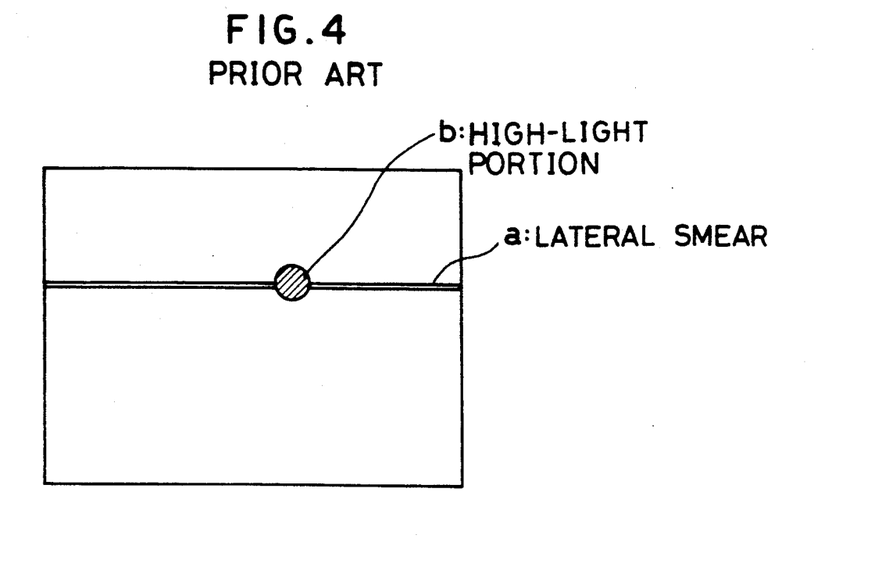
FIG. 4 is a view showing how a lateral smear is generated.

In the conventionally-constructed solid state imaging apparatus, when intense light is emitted, a pseudo signal "a" (lateral smear) is generated as shown in FIG. 4. In FIG. 4, reference character "b" designates a high-light portion. The following explains how such a lateral smear is generated. Because the reference line 7 is constructed so that bit lines which are not selected are all connected to the reference line 7, when intense light is emitted, an electric current on the order of several mA flows to the reference line 7. As shown in the equivalence circuit diagram of FIG. 5, when such a current flows, the electric potential of the reference line 7 increases because of the parasitic resistance "r" of the reference line 7. The parasitic capacity $C_V$ of each bit line is thereby charged. In the above equivalence circuit, pixels are each indicated by electric current sources $i_1, i_2 ... i_n$.

Figure 5:
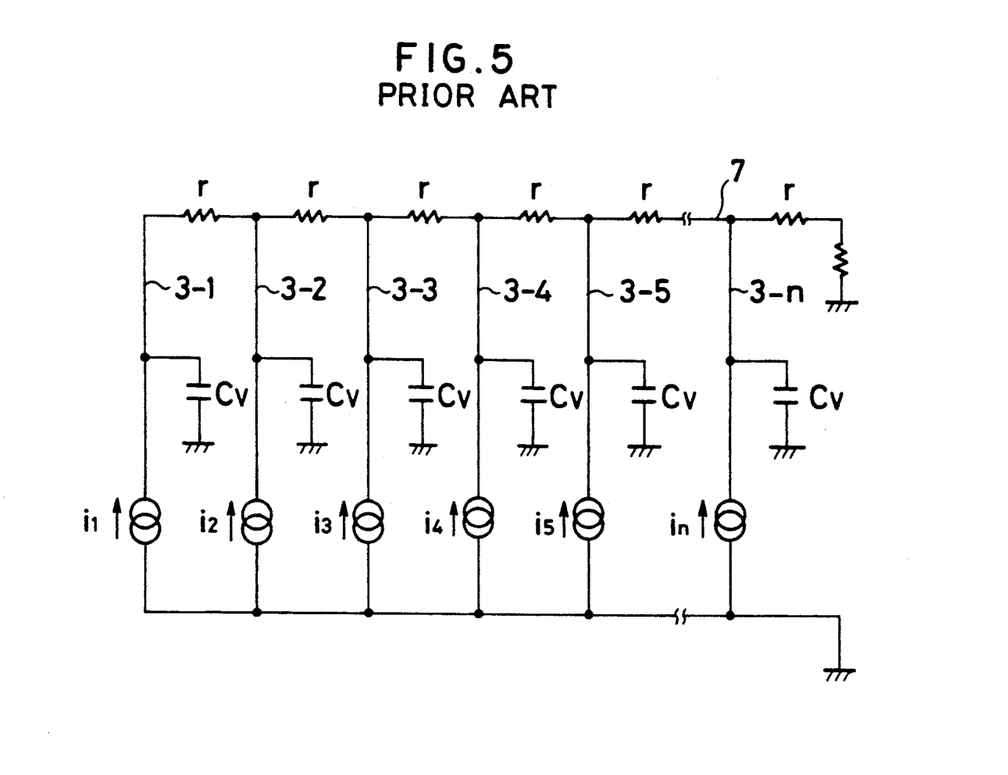
FIG. 5 is a diagram showing an equivalence circuit of the horizontal scanning circuit section of FIG. 2.

Under the above conditions, when a bit line is selected, the original signal current is overlapped by a discharge current of the bit line parasitic capacity $C_v$. This generates a lateral smear. When a bright subject is formed into an image on an entire scene, a relatively large amount of an output current of all of the bit lines, except a selected bit line, flows to the reference line. Therefore, a phenomenon similar to the above is also generated.

SUMMARY OF THE INVENTION

The present invention has been made in order to solve the above problems of the conventional solid state imaging apparatus. The object of the invention is therefore to provide a solid state imaging apparatus which inhibits the generation of a lateral smear, and reduces the amount of an electric current consumed.

In order to solve the above problems, this invention provides a solid state imaging apparatus comprising a pixel array in which CMDs are used as pixels and the pixels are arranged in a matrix manner; a plurality of row lines commonly connected to the gates of a group of the pixels arranged in an X direction; a plurality of bit lines commonly connected to the sources of a group of the pixels arranged in an Y direction; an output line commonly connected to the respective bit lines through selecting switches; a reference line of a reference potential commonly connected to the bit lines through non-selection switches; vertical scanning means for operating the row lines; and horizontal scanning means for operating the selecting switches and non-selection switches; wherein the horizontal scanning means is constructed so that, prior to a read period during which each bit line is connected to the output line, the horizontal scanning means connects each bit line to the reference line for the amount of time equal to a 1-bit period or a bit period less than the number of horizontal pixels.

The above construction is capable of limiting the amount of an electric current flowing to the reference line, thereby inhibiting an increase in the potential of the reference line. The generation of a lateral smear is thus inhibited. Also, since the amount of the electric current flowing to the reference line is limited, it is possible to reduce the amount of the electric current consumed.

DESCRIPTION OF THE PREFERRED EMBODIMENTS

The embodiments of the present invention will be described below. Since the horizontal scanning circuit sections of this invention are the only components which differ from those of the conventional solid state imaging apparatus, only this horizontal scanning circuit section will be explained and shown in the drawings.

Figure 6:
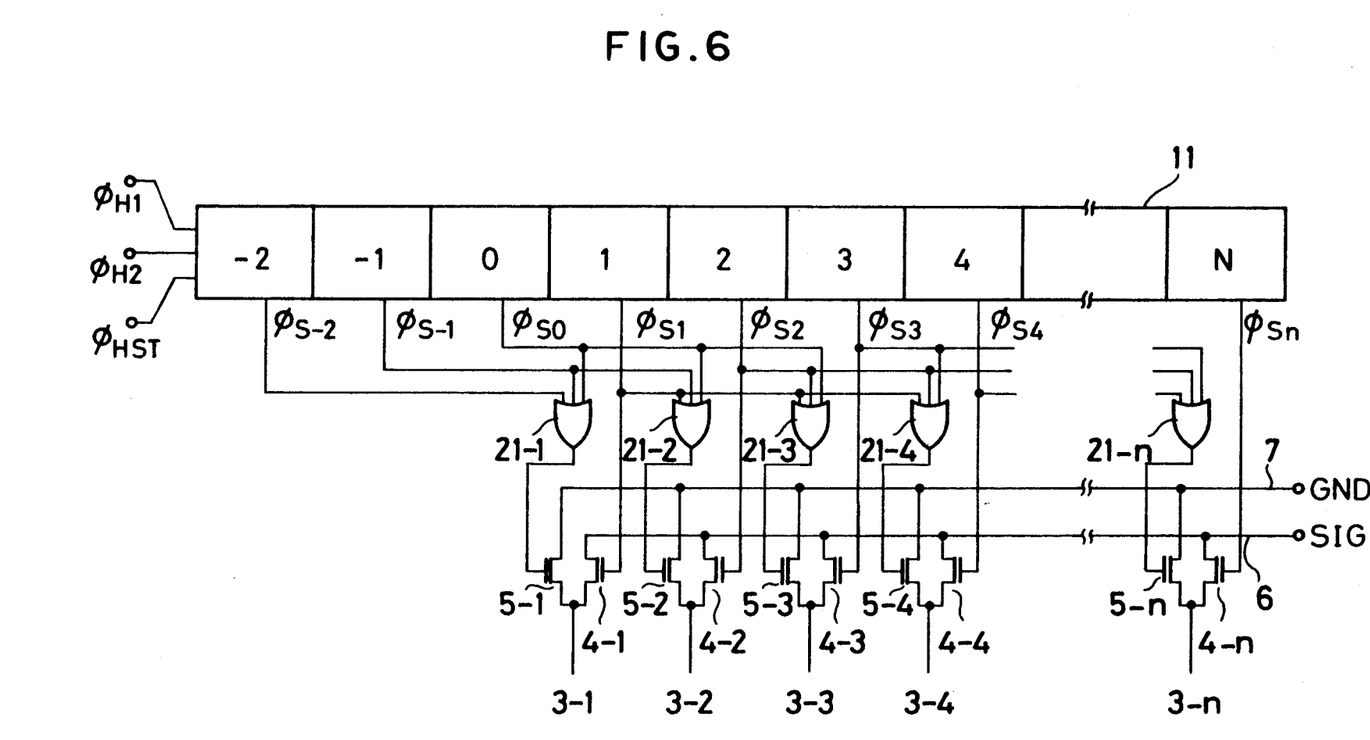
FIG. 6 is a diagram showing the structure of a horizontal scanning circuit section in accordance with a first embodiment of the present invention.

FIG. 6 is a diagram showing the structure of a horizontal scanning circuit section in accordance with a first embodiment of the invention. In FIG. 6, members which are the same as or equivalent to those in the conventional art shown in FIG. 2 are designated by the identical reference numbers. In FIG. 6, reference number 11 denotes the horizontal scanning circuit which is composed of shift registers having N+K stages, where "N" is the number of valid horizontal pixels, and "K" is within a range of $1 \leq K < N$, "K" being three in this embodiment. The horizontal scanning circuit 11 is constructed in such a way that outputs, that is, horizontal selection signals $\phi_{s1}, \phi_{s2}, \phi_{s3} \ldots \phi_{sn}$ of the shift registers 1, 2, 3 . . . N are respectively applied to the gates of transistors 4-1, 4-2, 4-3 . . . 4-n for selecting a column (column selecting transistors 4-1, 4-2, 4-3 .. 4-n). The column selecting transistors 4-1, 4-2, 4-3 . . . 4-n correspond to the shift registers 1, 2, 3 .. N in the horizontal scanning circuit 11. Outputs, that is, horizontal selection signals $\phi_{s-2}, \phi_{s-1}, \phi_{s0}$ of the shift registers of previous K stages (K=3)) −2, −1, 0, are respectively applied through OR circuit 21-1 to the gates of non-selection transistor 5-1 ; outputs, that is, horizontal selection signals $\phi_{s-1}, \phi_{s0}, \phi_{s1}$ of the shift registers −1, 0, 1, are respectively applied through OR circuit 21-2 to the gate of non-selection transistor 5-2 ; and outputs, that is, horizontal selection signals $\phi_{s.N-3}, \phi_{s.N-2}, \phi_{s.N-1}$ of the shift registers N-1, N-2, N-3, are respectively applied through OR circuit 21-n to the gate of non-selection transistor 5-n. The shift registers of previous K stages are those which are actuated at any given time just before a register is operated.

Figure 7:
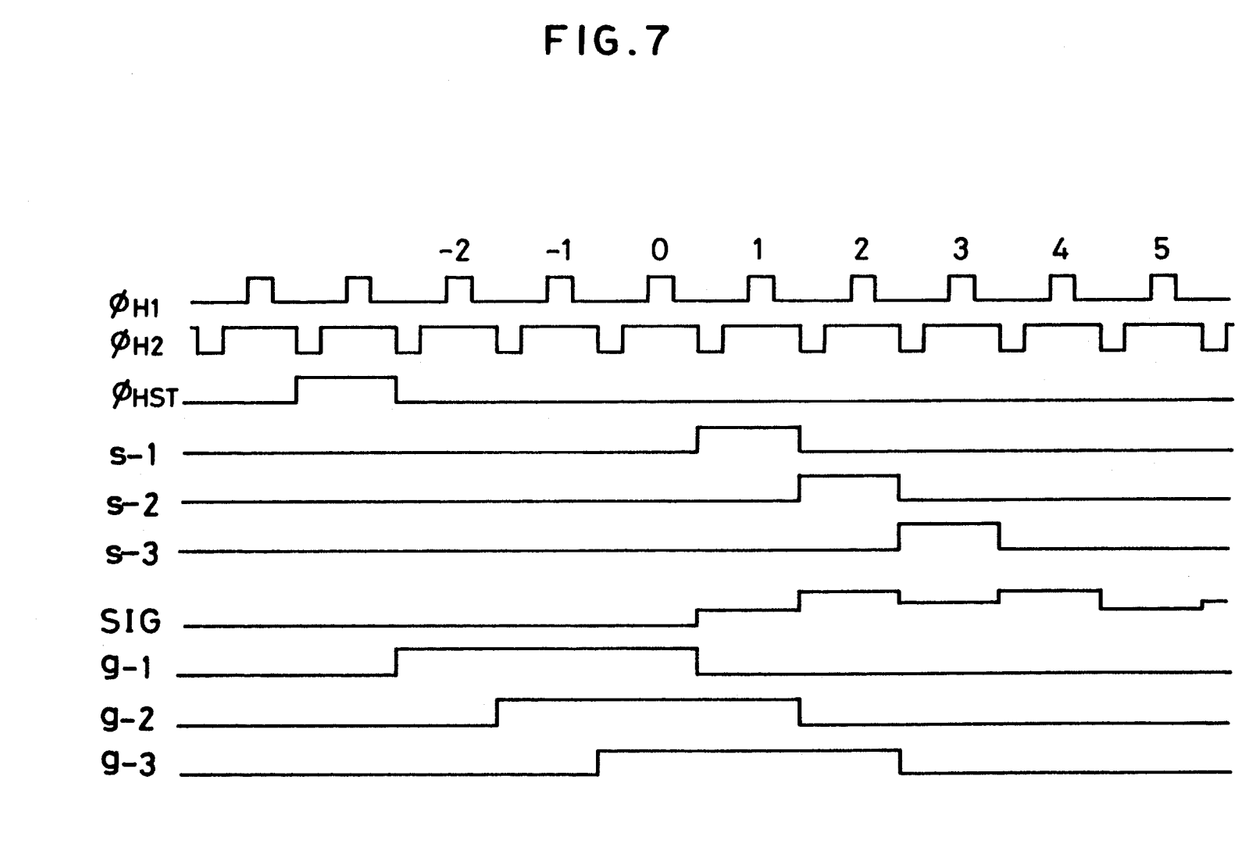
FIG. 7 is a timing chart illustrating the operation of the first embodiment.

FIG. 7 is a chart showing operational timing of the thus-constructed horizontal scanning circuit section. By shifting a start pulse $\phi_{HST}$ forward for the amount of time equal to "K" bits, gate selecting pulses of the non-selection transistors 5-1, 5-2 and 5-3 are formed as shown by g-1, g-2 and g-3, respectively. Thus, before the column selecting transistors 4-1, 4-2 and 4-3 are respectively selected by gate selecting pulses s-1, s-2 and s-3 so as to read the signals, the non-selection transistors 5-1, 5-2 and 5-3 are turned ON by the output from the shift registers of previous K stages (K=3), which registers are actuated at any given time just before a register is operated. The column selecting transistors 4-1, 4-2 and 4-3 correspond to the non-selection transistors 5-1, 5-2 and 5-3. Therefore, prior to a reading period, bit lines 3-1, 3-2 . . . 3-n are each connected to a reference line 7 for the amount of time equal to "K" (three) bits. "K" (three) bit lines are connected to a reference line 7. In FIG. 7, reference character SIG denotes an output signal read by a signal line 6.

In such an arrangement, an electric current smaller than that used in the conventionally-constructed solid state imaging apparatus flows to the reference line 7. The generation of a lateral smear is thereby inhibited.

The number of stages of the shift registers connected to the respective non-selection registers, that is, the number of bit lines connected to the reference line may be appropriately determined in accordance with a layout pattern of an imaging element.

Figure 8:
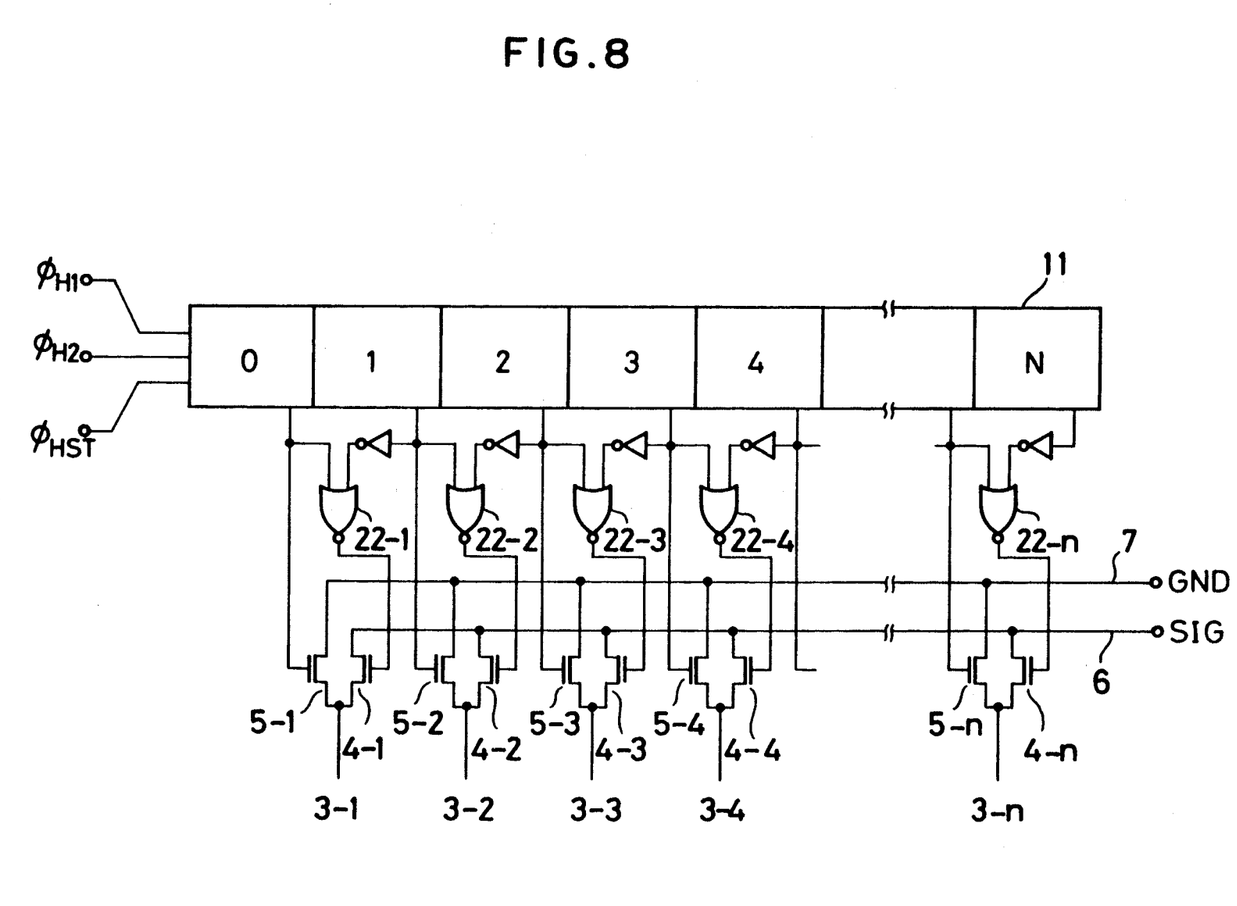
FIG. 8 is a diagram showing the structure of a horizontal scanning circuit section in accordance with a second embodiment.

FIG. 8 is a diagram showing the structure of a horizontal scanning circuit section in accordance with a second embodiment. In this embodiment, a horizontal scanning circuit 11 is composed of shift registers having N+1 stages. It is constructed in such a manner that non-selection transistors 5-1, 5-2 . . . 5-n are turned ON and OFF by the outputs of the respective shift registers. The horizontal scanning circuit 11 is also constructed in the following way. At any given time, the outputs and inversion outputs of shift registers which are in stages next to these registers, are input through NOR circuits 22-1, 22-2 . . . 22-n to the gates of column selecting transistors 4-1, 4-2 . . . 4-n, respectively. The above outputs of the registers are also applied to the non-selection transistors 5-1, 5-2 . . . 5-n.

Figure 9:
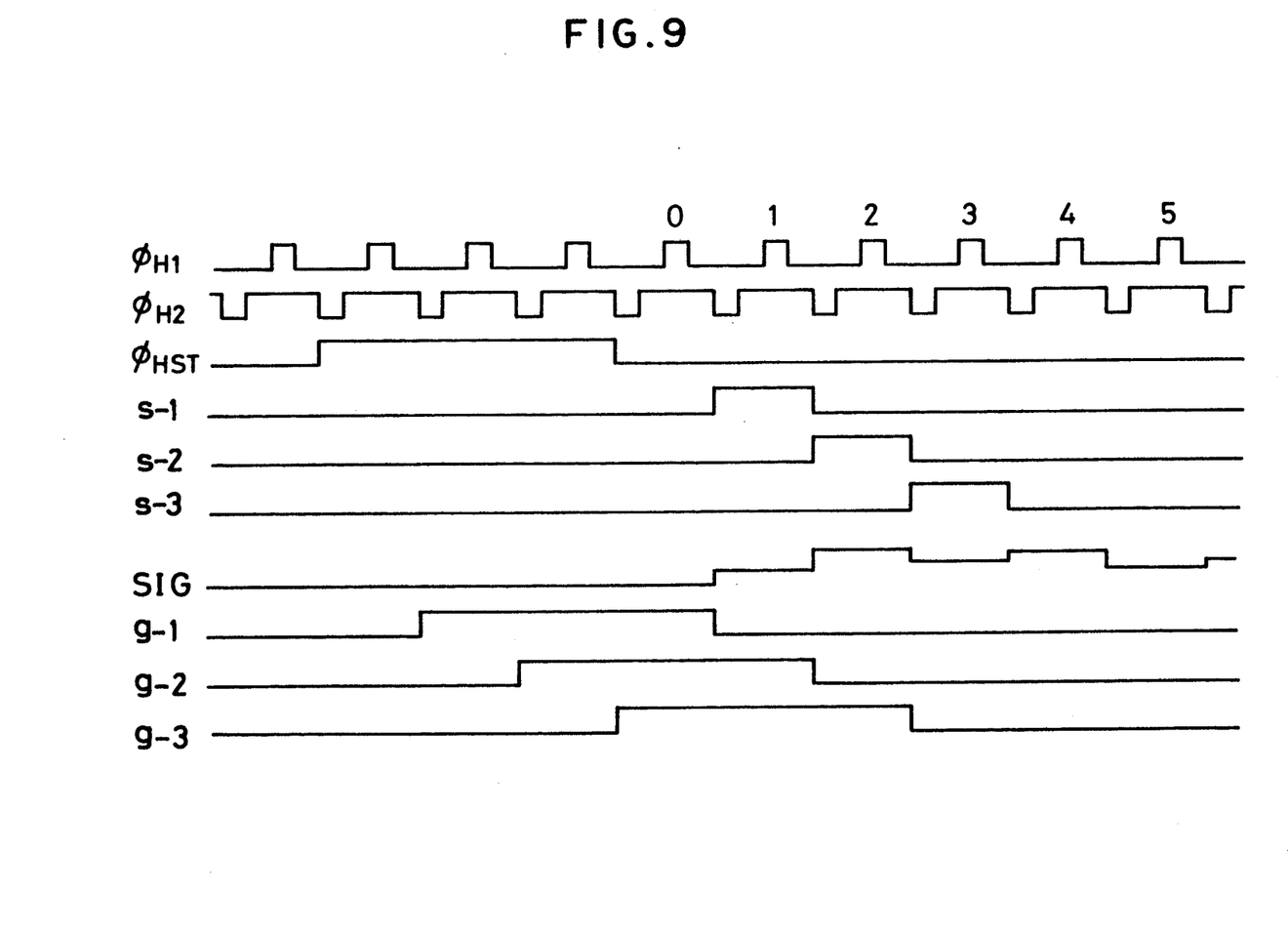
FIG. 9 is a timing chart illustrating the operation of the second embodiment.

In the section of the horizontal scanning circuit as constructed above, as shown in the timing chart of FIG. 9, a start pulse $\phi_{HST}$ is input beforehand in an amount equal to "K" bits. The start pulse $\phi_{HST}$ has the length of time equal to "K" bits (in this embodiment, K=3).

This input turns ON the non-selection transistors 5-1, 5-2 ... 5-n for the amount of time equal to "K" bits before the column selecting transistors 4-1, 4-2 ... 4-n, corresponding to the non-selection transistors 5-1, 5-2 ... 5-n, are respectively selected to read the signals. Therefore, prior to a reading period, bit lines 3-1, 3-2 ... 3-n can each be connected to a reference line 7 for the amount of time equal to "K" bits.

The value of "K" can arbitrarily be set by changing the width of the start pulse $\phi_{HST}$. This is a distinguishing feature of this embodiment.

Figure 10:
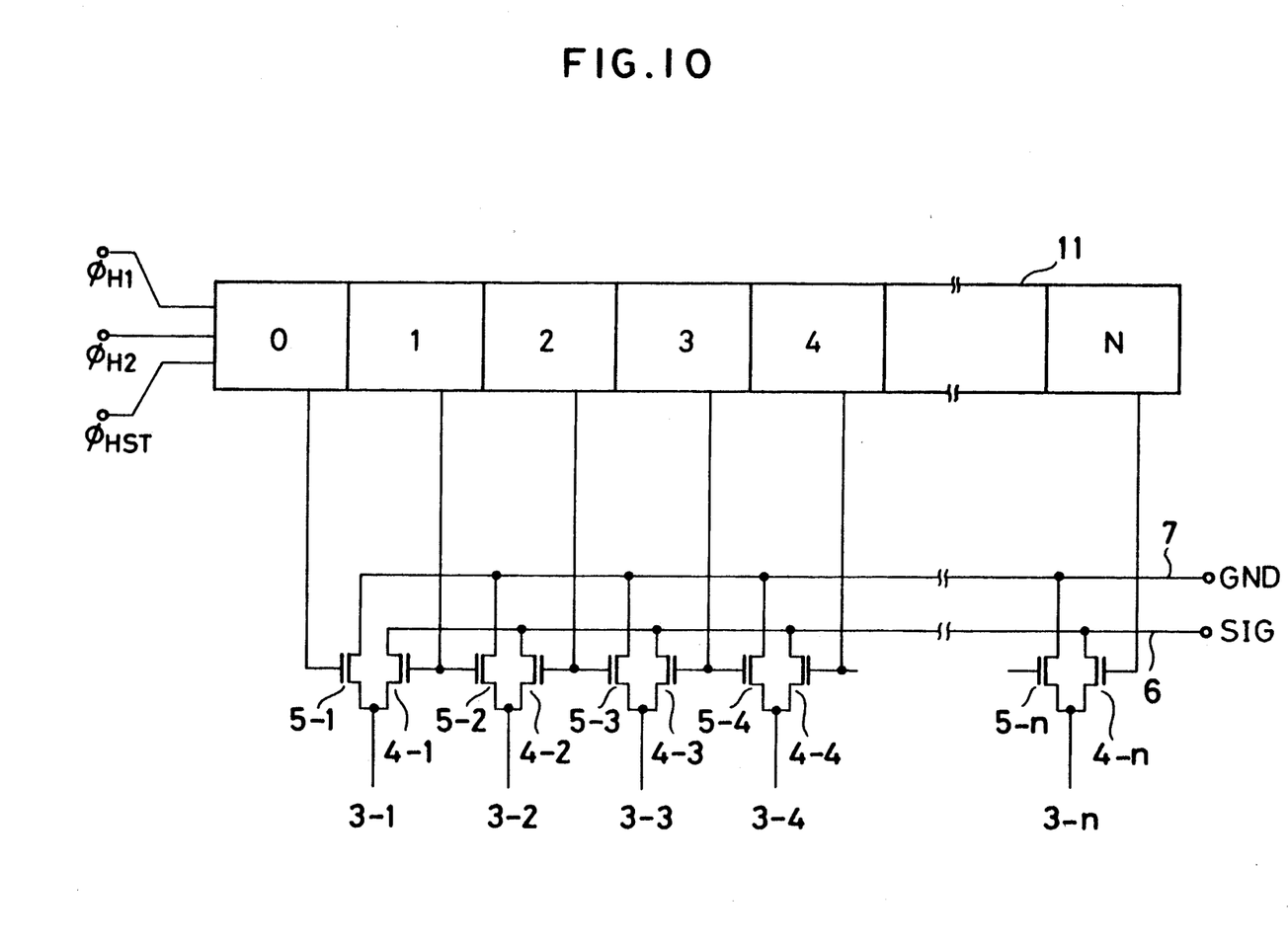
FIG. 10 a diagram showing the structure of a horizontal scanning circuit section in accordance with a third embodiment.

FIG. 10 is a diagram showing the structure of a horizontal scanning circuit section in accordance with a third embodiment, in which a horizontal scanning circuit 11 is made up of shift registers having N+1 stages. The horizontal scanning circuit 11 is constructed in the following way. Outputs of the registers are applied to the corresponding gates of column selecting transistors and non-selection transistors. These shift registers are in stages next to other shift registers, and operate in order to turn ON and OFF both types of transistors at the same time.

Figure 11:
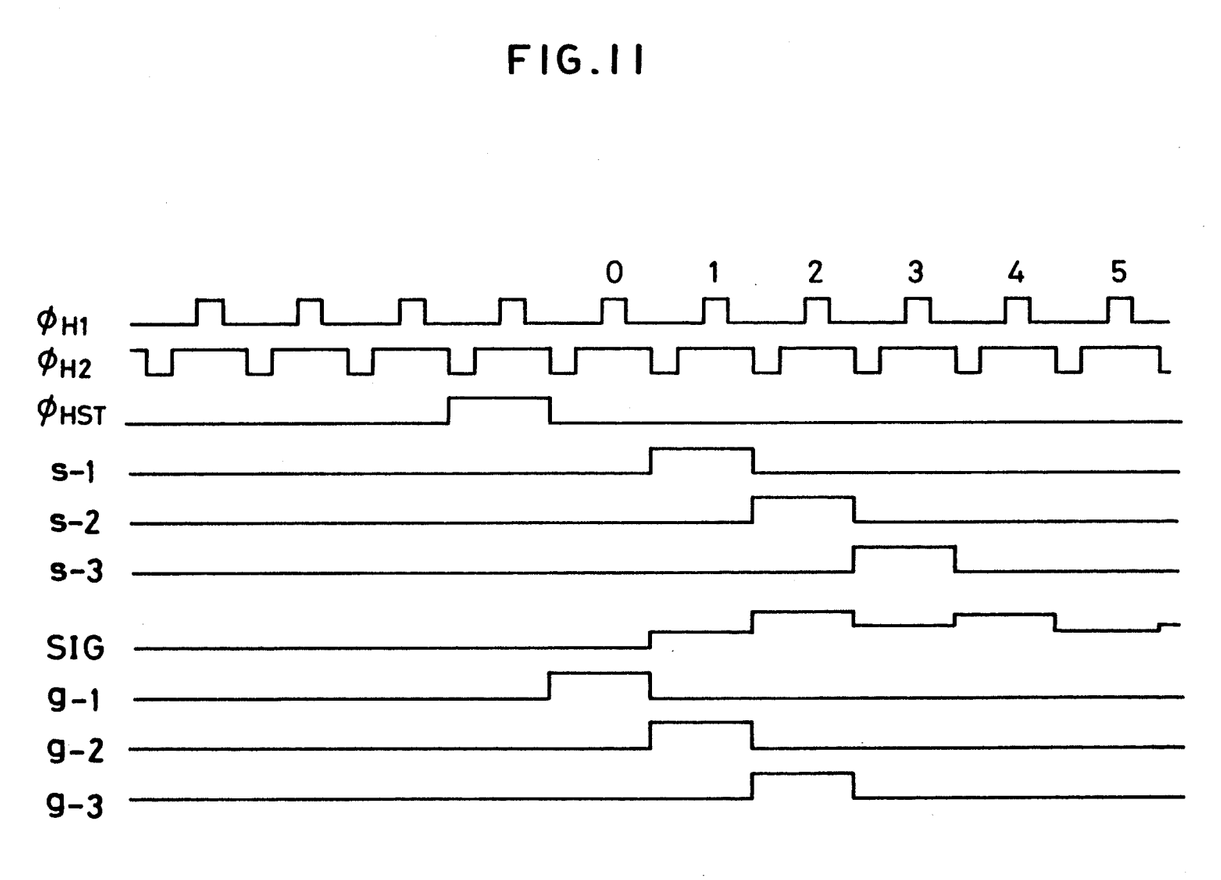
FIG. 11 is a timing chart illustrating the operation of the third embodiment.

In the thus-constructed horizontal scanning circuit section, as shown in the timing chart of FIG. 11, a start pulse $\phi_{HST}$ is input beforehand in an amount equal to 1 bit. This input turns ON the non-selection transistors 5-1, 5-2 ... 5-n for the amount of time equal to 1 bit before the column selecting transistors 4-1, 4-2 ... 4-n, corresponding to the non-selection transistors 5-1, 5-2 5-n, are respectively selected to read the signals. Therefore, prior to a reading period, bit lines 3-1, 3-2 ... 3-n are each connected to a reference line 7 for the amount of time equal to 1 bit.

This embodiment with a very simple construction is effective when a relatively small element is used and a time constant for discharging a bit line parasitic capacity $C_v$ is small, and when it is sufficient for the bit lines to be connected to the reference line for the amount of time equal to 1 bit. This is a unique feature of this embodiment.

In the above first and second embodiments, it is possible to arbitrarily set the value of "K" in accordance with conditions under which the element operates and for services for which the element is intended. The structure of gate circuits to be added is not limited to those disclosed in the embodiments mentioned above. Gate circuits having any structure may also be applied, so long as the timing is the same for opening and closing the column selecting transistors and non-selection transistors.

In addition, the above-described embodiments may also be readily applied to a solid state imaging apparatus of a multiple-line readout system which utilizes a plurality of signal lines to read an image signal.

In a CMD solid state imaging apparatus having a section of a horizontal scanning circuit which is constructed as in the above embodiments, when an overflow operation is performed for CMD pixels, the electric potentials of bit lines increase more than those which are read normally. This is because the bit lines are in a floating state during a horizontal blanking period. As a result, the overflow operation is not carried out properly.

Figure 12:
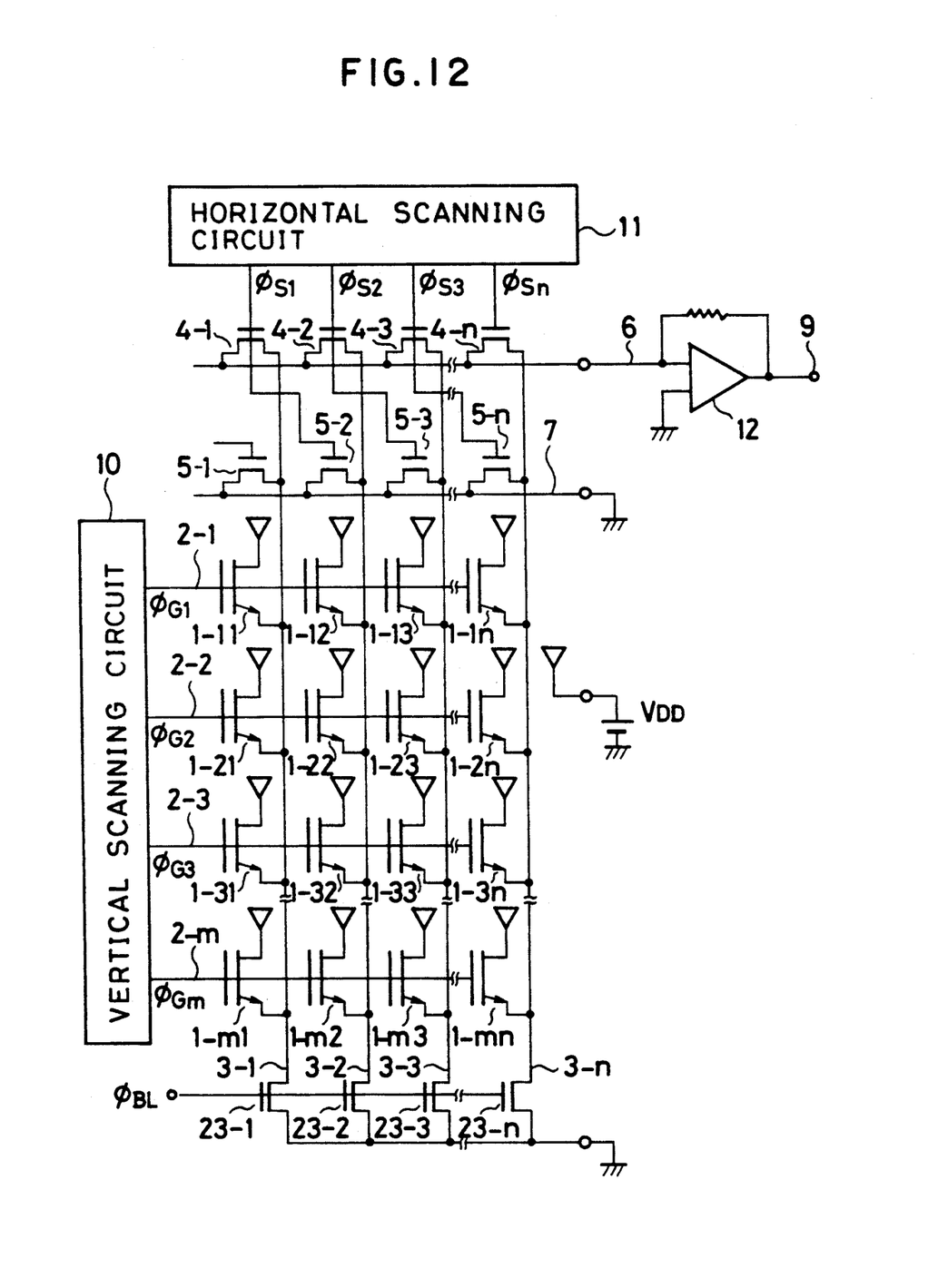
FIG. 12 is a diagram showing the structure of circuitry in accordance with a fourth embodiment.

A fourth embodiment shown in FIG. 12 is an embodiment which solves such a problem. This embodiment is constructed in the following way. Switching transistors 23-1, 23-2 ... 23-n are provided for fixing the reference electric potentials of the bit lines during the horizontal blanking period, that is, while the overflow operation is performed. A pulse $\phi_{BL}$ which sets itself at an H level for only the horizontal blanking period is applied to the gates of the switching transistors 23-1, 23-2 ... 23-n. This construction permits the overflow operation to be appropriately performed.

Though this embodiment is applied to the third embodiment shown in FIG. 10, it may also be applied to the first and second embodiments as well as to a structure similar to those of the first and second embodiments.

As has been described above based on the embodiments, the present invention is capable of limiting the amount of an electric current flowing to a reference line, thereby inhibiting an increase in the potential of the reference line. The generation of a lateral smear is thus inhibited. Also, since the amount of the electric current flowing to the reference line is limited, it is possible to reduce the amount of the electric current consumed.

What is claimed is:

1. A solid state imaging apparatus comprising:
   a pixel array having a plurality of pixels, the pixels being arranged in a matrix and each pixel having a CMD therein;
   a plurality of row lines commonly connected to gates of a group of the pixels arranged in an X direction;
   a plurality of bit lines commonly connected to sources of a group of the pixels arranged in an Y direction;
   a plurality of selecting switches;
   a plurality of non-selection switches;
   an output line commonly connected to respective bit lines through said selecting switches;
   a reference line of a reference potential commonly connected to the bit lines through said non-selection switches;
   vertical scanning means for operating said row lines; and
   horizontal scanning means for operating said selecting switches and non-selection switches, wherein said horizontal scanning means is operatively connected to control gates of said selecting and non-selection switches such that, prior to a read period during which each of said bit lines is connected to said output line, said horizontal scanning means connects each of said bit lines to said reference line for an amount of time equal to a 1-bit period or a bit period less than a number of horizontal pixels,
   said horizontal scanning means including shift registers having a plurality of stages, and being connected to said selecting and non-selection switches such that an output of each of the plurality of stages is operatively connected to a selecting switch corresponding to a current stage and to a non-selection switch of a succeeding stage.

2. A solid state imaging apparatus according to claim 1, wherein
   each of said selecting switches being respectively and operatively connected to the output of the current stage of the shift registers which correspond to said selecting switches,
   said horizontal scanning means further includes a plurality of OR circuits connected such that said non-selection switches are respectively and operatively connected to outputs of preceding stages of the shift registers which are connected through the OR circuits to said non-selection switches, the preceding stages of the shift registers connected through the OR circuits being those that are actuated at any given time just before a succeeding stage is operated, and that correspond to a desired bit period.

3. A solid state imaging apparatus according to claim 1, wherein each stage of the shift registers having outputs and inversion outputs, said selecting switches being operatively connected to outputs of NOR circuits, the inversion outputs of a current stage of the shift registers being connected through the NOR circuits to corresponding selecting switches and outputs of preceding stages of the shift registers being connected to corresponding non-selection switches of the current stages, and further the outputs of a preceding stage of the shift registers also being connected through the NOR circuits to corresponding selecting switches.

4. A solid state imaging apparatus according to claim 1, wherein outputs of current stages of the shift registers being directly connected to said non-selection switches in succeeding stages and to said selecting switches corresponding to the current stages of the shift registers.

5. A solid stage imaging apparatus according to claim 1, further comprising: means for fixing, during a horizontal blanking period, each bit line to a reference potential simultaneously, said fixing means being operatively and commonly connected to the bit lines.

6. A solid stage imaging apparatus according to claim 2, further comprising: means for fixing, during a horizontal blanking period, each bit line to a reference potential simultaneously, said fixing means being operatively and commonly connected to the bit lines.

7. A solid state imaging apparatus according to claim 3, further comprising: means for fixing, during a horizontal blanking period, each bit line to a reference potential simultaneously, said fixing means being operatively and commonly connected to the bit lines.

8. A solid state imaging apparatus according to claim 4, further comprising: means for fixing, during a horizontal blanking period, each bit line to a reference potential simultaneously, said fixing means being operatively and commonly connected to the bit lines.

* * * * *